United States Patent

Dangschat

[15] 3,646,424

[45] Feb. 29, 1972

[54] ELECTRICAL COMPONENT PROTECTED AGAINST HIGH TENSION, PARTICULARLY FOR COLOR TELEVISION RECEIVERS AND METHOD OF ITS PRODUCTION

[72] Inventor: Rainer H. Dangschat, Landsham, Germany

[73] Assignee: Siemens Aktiengesellschaft, Berlin and Munich, Germany

[22] Filed: Jan. 23, 1970

[21] Appl. No.: 5,321

[30] Foreign Application Priority Data

Jan. 23, 1969 Germany ......................P 19 03 351.3

[52] U.S. Cl. ..........................321/15, 321/8 C, 317/101 CM, 174/52 PE

[51] Int. Cl. ..........................................................H02m 7/00

[58] Field of Search ........................317/101, 102 C, 234, 10; 321/15, 8 C; 174/52.6; 29/627; 338/275

[56] References Cited

UNITED STATES PATENTS

| | | | |
|---|---|---|---|
| 2,369,772 | 2/1945 | Bouwers | 321/15 |
| 2,941,258 | 6/1960 | Riley | 264/272 |
| 3,044,127 | 7/1962 | Alden | 264/272 |
| 3,164,749 | 1/1965 | Berge et al. | 174/52.6 |
| 3,225,258 | 12/1965 | Brekoo et al. | 174/52.6 |

*Primary Examiner*—David Smith, Jr.
*Attorney*—Hill, Sherman, Meroni, Gross & Simpson

[57] ABSTRACT

A grid-shaped electrical component is formed by molding a plurality of electrically interconnected capacitors and diodes, physically forming a grid structure, within a synthetic casting resin. The electrical components form the cores of the struts of the grid structure and each strut is provided with a plurality of indentations in the synthetic resin in the area of the walls of the components.

1 Claims, 2 Drawing Figures

INVENTOR
RAINER DANGSCHAT
BY Hill, Sherman, Meroni, Gross & Simpson ATTORNEYS

ELECTRICAL COMPONENT PROTECTED AGAINST HIGH TENSION, PARTICULARLY FOR COLOR TELEVISION RECEIVERS AND METHOD OF ITS PRODUCTION

BACKGROUND OF THE INVENTION

1. Field of the Invention

This invention relates to a grid-shaped electrical component having grid struts extending substantially in two main grid directions, and more particularly to grid-shaped components which are protected against high tension, particularly for color television receivers.

2. Description of the Prior Art

Heretofore, the prior art recognized a conventional expedient to provide a color television receiver with a line transformer to generate the high voltage required for the picture tube. This line transformer was advantageously utilized to provide high voltage pulses which were then rectified prior to being employed at the picture tube. Construction of the line transformer for protection against high voltages, as well as the associated rectifier arrangement, has proven difficult in situations wherein the transformer was required to deliver the full value of the required high voltage. This is particularly true in the case of color television receivers since a direct current voltage of approximately 25kv. is ordinarily required for proper operation of the picture tube.

In view of the foregoing it is therefore advisable to design the line transformer for a lower voltage and to generate a direct current voltage of the required magnitude by utilization of a multiplier cascaded with the line transformer. For example, it is significant that the line transformer delivers recoil pulses with an amplitude of 8.5kv., from which a DC voltage of 25kv. can be obtained in a multiplier cascade having 5 silenium rectifiers and four or five capacitors.

In electrical equipment technology, however, there is always the problem, as here in a multiplier cascade, to design components free from brush discharge and protected against high tension, so that neither adjacent components nor the operating personnel can be harmed. To this end, it is generally known in the art to combine such units which are exposed to high tension into a single component which can be built in or exchanged as a one unit component both during original manufacture of the apparatus and in case of maintenance or repair.

Arrangements of the type initially mentioned avoid a majority of the inconvenience experienced heretofore by components manufactured to meet the above conditions. Thus, for example, the corresponding components are frequently cast with plastic into one compact block. However, in addition to the problem of an effective heat dissipation there is the further difficulty that the wall strength of the grouting mass between the components is not sufficiently constant, or that the metallic connecting elements of the components or the wiring may appear on the surface and cause glow defects or flash-overs.

To avoid the latter drawbacks it is also an old expedient in the art to fixedly arrange the components of the unit on a base plate and to cast the entire unit in a beaker consisting of a material which is combined with the grouting mass. However, these solutions have the drawback that casting in a beaker is relatively expensive and that as a result of these steps the problem of cooling the component parts is rendered more difficult.

Although the component parts of the type initially mentioned have great advantages from the electrical point of view as well as with regard to the manufacturing cost, there is also an additional difficulty as a result of the size of the components thus produced. In many cases, particularly in the interior of electrical apparatus such as, for example, color television sets, the measurements of which one seeks to reduce through the use of integrated switching circuits, it is frequently undesirable or even quite impossible to accommodate the component parts.

Hence, it is an object of the invention to produce an electrical component protected against high tension which has the advantages of a component of a type mentioned initially, but which has smaller dimensions than heretofore known in employing the same individual components.

SUMMARY OF THE INVENTION

According to the invention, the component parts are disposed in a molded grid structure wherein certain component parts lie in one grid direction, other component parts lie in another grid direction, and still other components are disposed obliquely to the two main grid directions. Each of the individual components are molded in a strut of the grid structure and the components parts which are disposed in one grid direction and those disposed obliquely to the grid directions are located in one plane, while the component parts disposed in the other grid direction lie in a plane parallel to the first-mentioned plane. Through this arrangement with the component parts lying in different planes, one can substantially reduce the space required for the apparatus in question without adversely affecting the advantages of prior known constructions.

As shown in relatively long experiments, it is very important for an effective operation of the apparatus that the wall strength of the synthetic resin enveloping the component parts is substantially equally large throughout the entire apparatus. It has namely been shown that the important point is that the thickness of the layer of synthetic resin varies only relatively little throughout the apparatus, and in all respects the variation is not excessive, since otherwise there may be the danger that the sealing layer will crack upon cooling. The danger of a crack formation may also be responsible for the fact that with the component parts known heretofore and case in the form of a block with or without a beaker, only adverse results were obtained since the plastics suitable for the electrical components with respect to high tension do not lend themselves to casting into blocks.

A new type of apparatus which is protected against high tension in accordance with the principles of the present invention is particularly suitable for a high tension multiplier cascade in color television sets of the type mentioned initially which contains a plurality of rectifier elements and capacitors. A further development of the invention provides that the capacitors lie parallel one behind the other in an upper plane, that in the second plane lying therebeneath a portion of the rectifier elements is spaced at a distance from the other plane and lie perpendicular to the capacitors, and that in a diagonal line of each rectangle defined by two capacitors and two rectifiers there is arranged an additional rectifier in the second lower plane. For the electrical connection of the component part with the elements of a corresponding circuit, it is provided that electrical conductors are guided outwardly from adjacent ends of the rows of capacitors, the conductors first extending a distance within the synthetic casting resin substantially parallel to the capacitors at one end of the apparatus, and at the opposite end of the apparatus the electrical conductors extend from the rows of capacitors whose ends are connected with a rectifier element and guided outwardly therefrom through the envelope of synthetic resin.

BRIEF DESCRIPTION OF THE DRAWINGS

Other objects, features and advantages of the invention will become apparent from the following detailed description taken in conjunction with the accompanying drawings, in which.

DESCRIPTION OF THE PREFERRED EMBODIMENT

Figure 1:
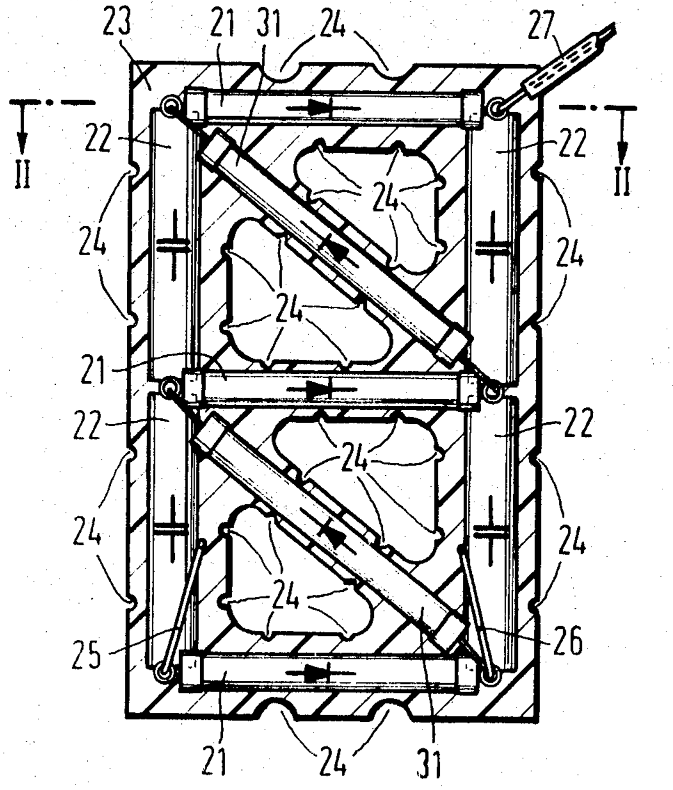
FIG. 1 is a plan view, partially in section, illustrating apparatus constructed according to the invention.

FIG. 1 illustrates a high tension cascade constructed in accordance with the principles of the present invention to produce the accelerating voltage required for color television tubes amounting to approximately 25 kv. consisting of five silenium rectifiers 21, 31 and four capacitors 22, fifth capacitor not cast within the component part must be separately connected thereto. Therefore, this capacitor is not shown in the drawing. The reference numerals 25, 26 and 27 designate the electrical conductors which are guided outwardly through the synthetic resin 23. The electrical conductors 25 and 26 on the base side of the component part are first pulled a distance upwardly in the synthetic resin casing so that when they exit the component part (see FIG. 2) the conductors are already sufficiently separated from the base side which is generally connected with the base frame. The indentations 24 in the synthetic resin compound are shown somewhat exaggerated schematically, since the indentations generally end, at least partly, on the wall portions of the component parts which are protected against high tension. The indentations 24 are produced during the manufacture of the cascade in accordance with the invention, wherein the interconnected electrical components which form a loose grid are placed in a mold consisting of a material, such as polyethylene or polypropylene, which does not combine with the casting resin, for example, epoxy resin. Within this mold there are disposed spacing blocks which are preferably formed directly on the mold and which are arranged and dimensioned such that they assure a sufficient space between live metal parts of the electrical components and the inner wall of the mold when the loose grid is installed. Owing to the tolerances required for a simple insertion of the grid of component parts, not all component parts will rest against all spacing blocks provided for the centering thereof so that not all of the indentations 24 in the synthetic resin compound 23 reach as far as the high tension resistant wall of the component part accommodated within the corresponding strut. The fact is illustrated schematically in the drawing where some of the indentations do not reach quite as far as the component parts.

Figure 2:
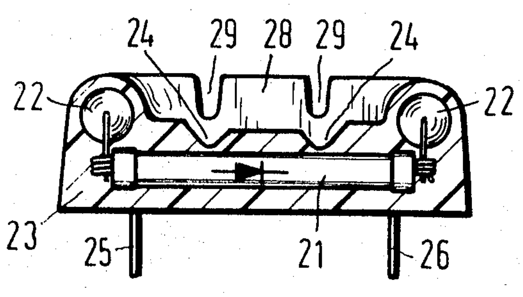
FIG. 2 is a sectional view taken along the line II—II of FIG. 1.

As apparent from FIG. 2, a plastic strip 28 is provided on the narrow side (base side) of the component part remote from the high tension conductor 27, which interconnects the parallel rows of capacitors and wherein recesses 29 are provided by means of which the component part can be screwed onto the apparatus or attached in a different manner.

The invention is not limited to the embodiment shown. For example, is it also possible to form separate feet on the component for attachment purposes. It is likewise possible to slide the capacitors 22 still further inwardly by way of the rectifiers whereby a lateral contacting of the connection conductors of the capacitors is advantageous so as to make the lateral expansion of the component part still smaller. It is however, essential that the component forms a punctured grid structure since in this way there is, first, comparatively uniform wall strengths assured and, second, the cooling of the component elements can be separately effected without forcing the heat to first penetrate a larger layer of synthetic resin.

When employed in television sets, particularly color television sets, component parts in accordance with the invention may be built into advantage in horizontal position in so-called knapsacks, where as a result of their grid-shaped construction, they not only do not impede the air circulation caused by heating of the other component parts of the set, but are at the same time effectively cooled as a result of the air currents flowing therethrough.

Changes and modifications may be made of the invention within the scope and spirit of the appended claims which define what is believed to be new and desired to have protected by Letters Patent.

What is claimed is:

1. A grid-shaped electrical component protected against high tension comprising a plurality of molded struts extending in substantially two grid directions and in at least one grid direction oblique thereto, each of said struts formed of synthetic resin and having a large wall strength, a plurality of electrically interconnected electrical components individually cast within and forming the respective cores or said struts, the components extending in one of said grid directions disposed to lie in one plane, the components extending in the other grid direction disposed to lie in another plane parallel to said one plane, the components extending in the oblique direction disposed to lie in one of said planes, said components comprising a plurality of capacitors disposed in the struts which extend in one grid direction and a plurality of rectifiers which are disposed in said struts which extend in the other grid direction and in the oblique grid direction, said capacitors forming serially connected rows of capacitors and said rectifiers connected to the ends of said capacitors, a first group of conductors disposed at one end of said grid structure and having the individual conductors thereof connected to the junctions of said electrical components and each including a portion extending substantially parallel to the respective capacitors and a portion extending through said grid structure generally perpendicular to the first-mentioned portions, and a second group of electrical conductors at the other end of said grid structure connected to the junctions of said electrical components thereat, said grid structure further including a base having mounting shoulders formed thereon, said grid structure together with said base and said conductors forming a self-supporting structure for permitting the passage of cooling air between said struts.

* * * * *

UNITED STATES PATENT OFFICE

CERTIFICATE OF CORRECTION

Patent No. 3,646,424 Dated February 29, 1972

Inventor(s) Rainer Dangschat

It is certified that error appears in the above-identified patent and that said Letters Patent are hereby corrected as shown below:

Column 2, line 34 for "case" read --cast--.

Column 3, line 3 for "22, fifth" read --22, a fifth--.

Column 3, line 45 for "is it also" read --it is also--.

Claim 1, column 4, line 25, for "cores or" read --cores of--.

Signed and sealed this 19th day of September 1972.

(SEAL)
Attest:

EDWARD M.FLETCHER,JR.
Attesting Officer

ROBERT GOTTSCHALK
Commissioner of Patents